United States Patent [19]

Gavish

[11] Patent Number: 5,696,993
[45] Date of Patent: Dec. 9, 1997

[54] APPARATUS FOR DECODING AND PROVIDING THE DECODED ADDRESSES TO INDUSTRY STANDARD PCMCIA CARD THROUGH THE DATA LINES OF THE PARALLEL PORT

[75] Inventor: Dan Gavish, Haifa, Israel

[73] Assignee: Intel Corporation, Santa Clara, Calif.

[21] Appl. No.: 162,595

[22] Filed: Dec. 3, 1993

[51] Int. Cl.$^6$ .................................................. G06F 13/00
[52] U.S. Cl. .................... 395/882; 395/500; 395/821; 395/834; 395/858
[58] Field of Search .................. 178/3; 341/154; 359/152; 380/23; 395/500, 841; 455/186.1

[56] References Cited

U.S. PATENT DOCUMENTS

| | | | |
|---|---|---|---|
| 4,476,347 | 10/1984 | Hagen et al. | 178/3 |
| 4,812,847 | 3/1989 | Stewart et al. | 341/154 |
| 5,142,624 | 8/1992 | Patrick, II | 395/200 |
| 5,293,424 | 3/1994 | Holtey et al. | 380/23 |
| 5,299,314 | 3/1994 | Gates | 395/200 |
| 5,334,030 | 8/1994 | Brilliott | 439/75 |
| 5,335,338 | 8/1994 | Proesel | 395/500 |
| 5,343,319 | 8/1994 | Moore | 359/152 |
| 5,381,538 | 1/1995 | Amini et al. | 395/425 |
| 5,408,614 | 4/1995 | Thornton et al. | 395/841 |

FOREIGN PATENT DOCUMENTS

WO 93/0950 5/1993 WIPO .

*Primary Examiner*—Thomas C. Lee
*Assistant Examiner*—Po C. Huang
*Attorney, Agent, or Firm*—Blakely, Sokoloff, Taylor & Zafman

[57] ABSTRACT

An interface circuit used to connect industry standard PCMCIA (Personal Computer Memory Card International Association) cards to a personal computer via a standard parallel printer port. The invention utilizes a mechanism which enables direct access to each I/O or memory address on a PCMCIA card independently. This is done by transferring an I/O or memory address in a PCMCIA card via the data lines of the parallel port, decoding this address, and providing the decoded address to the PCMCIA card. As a result, application software which accesses the PCMCIA card can run without modification. All that is needed is add-on code which captures and re-routes accesses generated by the application software to the parallel port. This add-on code captures the I/O instructions targeted at the I/O device associated with the PCMCIA card and replaces them with sequences of instructions routed through the parallel port. Another feature of the present invention is the generation of an internal ISA-like bus to handle card interrupts. This means that interrupts generated by the PCMCIA card are sensed by the internal bus of the invented parallel port interface unit, and then translated by the invented parallel port interface unit so that the host microprocessor services the interrupt.

6 Claims, 6 Drawing Sheets

5,696,993

APPARATUS FOR DECODING AND PROVIDING THE DECODED ADDRESSES TO INDUSTRY STANDARD PCMCIA CARD THROUGH THE DATA LINES OF THE PARALLEL PORT

SUMMARY OF THE INVENTION

The present invention is a system having a software component which runs in a personal computer and a hardware component or adapter used to connect industry standard PCMCIA (Personal Computer Memory Card International Association) cards which are standard expansion cards, providing features like LAN interface, modem, fax, flash EE-PROM, disk and the like, having a size, signal paths and power requirements according to industry standard specifications, to the parallel or printer port of the personal computer. The PCMCIA standard enables computers, usually portable or laptop computers which have PCMCIA slots, to obtain this additional functionality by inserting a suitable PCMCIA card into an empty PCMCIA slot and install whatever software may be required to take advantage of the functionality provided by the added hardware. While such PCMCIA cards provide this additional functionality in an industry standard manner, not all computers include the necessary PCMCIA slots into which a PCMCIA card may be installed. The present invention allows all personal computers which utilize a standard parallel printer port, which is used by nearly all personal computers, to utilize PCMCIA cards. Further, even personal computers which include one or more PCMCIA slots may require additional PCMCIA slots to obtain desired functionality. The present invention may also be used with computers with PCMCIA capability to provide a mechanism which allows for the installation of additional PCMCIA cards so long as a parallel printer port is available.

In the prior art, there are examples of interface units which enable computers without PCMCIA slots to utilize PCMCIA cards. However, such prior art interface units do not have the capability of functioning with all industry standard PCMCIA cards. Such prior art interface schemes are typically limited to interfacing only data storage cards because they utilize a "pipe" mechanism which can transfer a stream of data, but cannot access control registers and the like which are utilized by many PCMCIA cards such as LAN cards, modem cards and fax cards. The present invention utilizes a mechanism which enables direct access to each I/O or memory address on a PCMCIA card independently. This is done by transferring an I/O or memory address in a PCMCIA card via the data lines of the parallel port, decoding this address, and providing the decoded address to the PCMCIA card. As a result, application software which accesses the PCMCIA card can run without modification. All that is needed is add-on code which captures and re-routes accesses generated by the application software to the parallel port. This add-on code captures the I/O instructions targeted at the I/O device associated with the PCMCIA card and replaces them with sequences of instructions routed through the parallel port. Unlike prior art solutions, the present invention utilizes a combination of software and hardware to enable the use of I/O device PCMCIA cards while maintaining compatibility with the card hardware and software. By way of contrast, prior art solutions can only transfer a stream of data using specific drivers for storage device PCMCIA cards.

Another feature of the present invention is the generation of an internal ISA-like bus to handle card interrupts. This means that interrupts generated by the PCMCIA card are sensed by the internal bus of the invented parallel port interface unit, and then translated by the invented parallel port interface unit so that the host microprocessor services the interrupt.

DETAILED DESCRIPTION OF THE INVENTION

Figure 1:
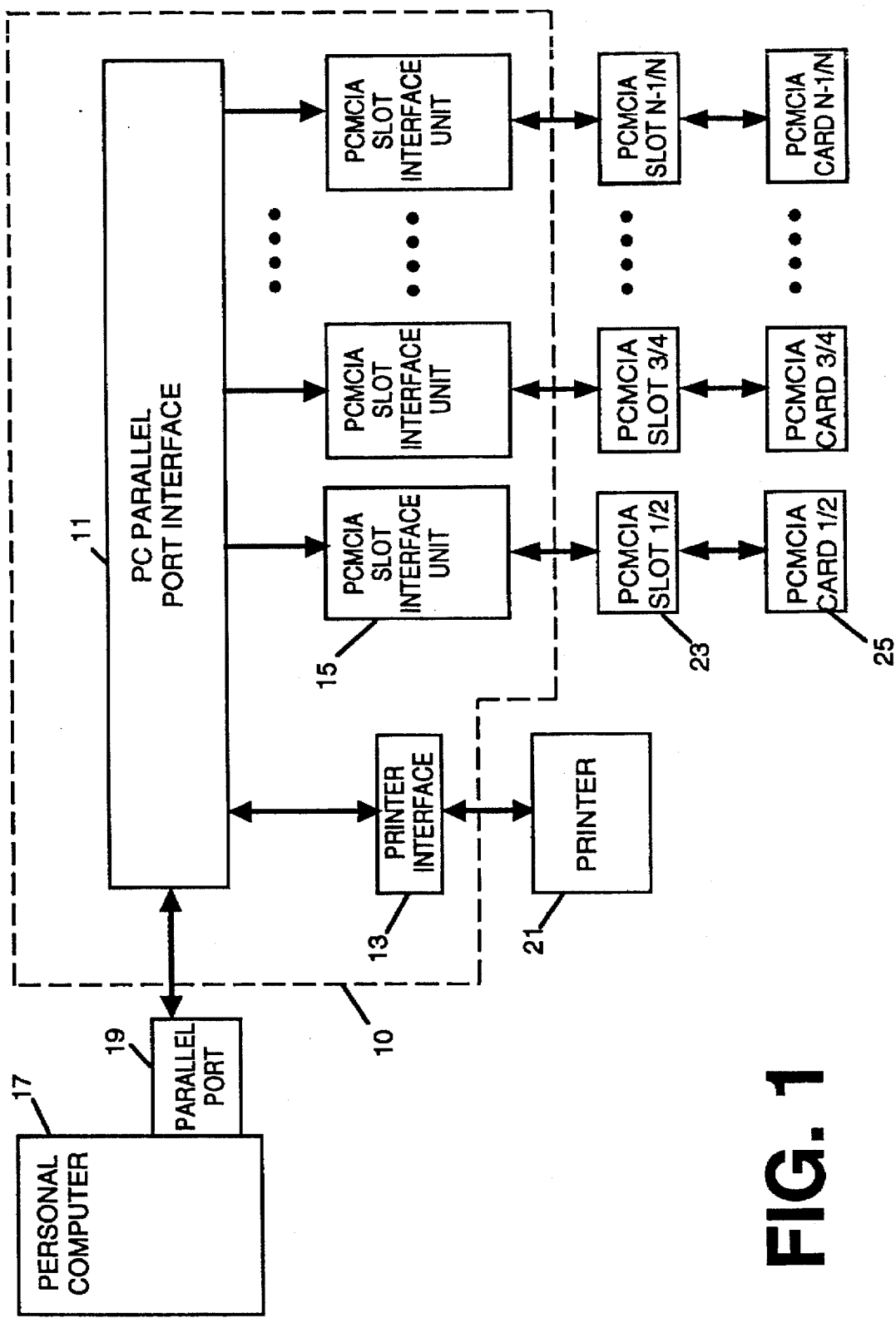
FIG. 1 is a block diagram showing the relationship of the invented PCMCIA card to parallel port adapter to a personal computer, a printer and PCMCIA cards.

Referring first to FIG. 1, the present invention is the combination of a parallel port interface 11, printer interface 13 and a PCMCIA slot interface unit 15 which operate together to enable signals from a personal computer 17 which are output through a parallel port 19 to be selectively sent to a printer 21 or PCMCIA slot 23 into which is inserted a PCMCIA card 25.

Personal computer 17 is a conventional personal computer having a parallel port 19 which is usually used to connect a printer 21. Parallel port 19 is often referred to as a printer port. A suitable personal computer would be an IBM PC with a 386 or faster processor.

The printer 21 is a standard printer such as a HP Laserjet which is usually connected directly to the printer port. The invented interface circuit 11 is connected to printer port 19 and, in one mode, operates as a printer pass-through port so that printer 21 can be used as if the invented parallel port interface were not present.

Parallel port interface 11 is connected to the parallel port (printer port) of PC 17 for data input/output. If the personal computer is equipped with a Fast Parallel Port (also known as Enhanced Parallel Port), then the parallel port interface will make use of its faster speed, thus providing better performance.

Parallel port interface 11 contains the circuits required to translate parallel port signals to multi-device bus signals required by PCMCIA cards. Since the parallel port does not include address signals which enable it to be concurrently connected to multiple devices, it is characterized as a single end pipe. That is, personal computer 17 transfers data to/from a single device, without the ability to access multiple register devices which would require address signals. Parallel port interface unit 11 "talks" with personal computer 17 via this single end pipe. Via this port, personal computer 17, through suitable software, provides encoded address information through parallel port 19, as well as control signals, and sends/receives data information. Parallel port interface unit 11 "talks" to an internal bus 27 using commonly used bus handshake (similar to an ISA bus), which means that address signals are provided, and data is transferred to the addressed device controlled by the control signals.

This mechanism is supported by personal computer 17 software which transfers address, data and control signals in the appropriate sequence via the parallel port.

Parallel port interface unit 11 can support different types of parallel ports, e.g., a uni-direction parallel port, a bi-direction parallel port, and/or an enhanced parallel port.

Figure 2:
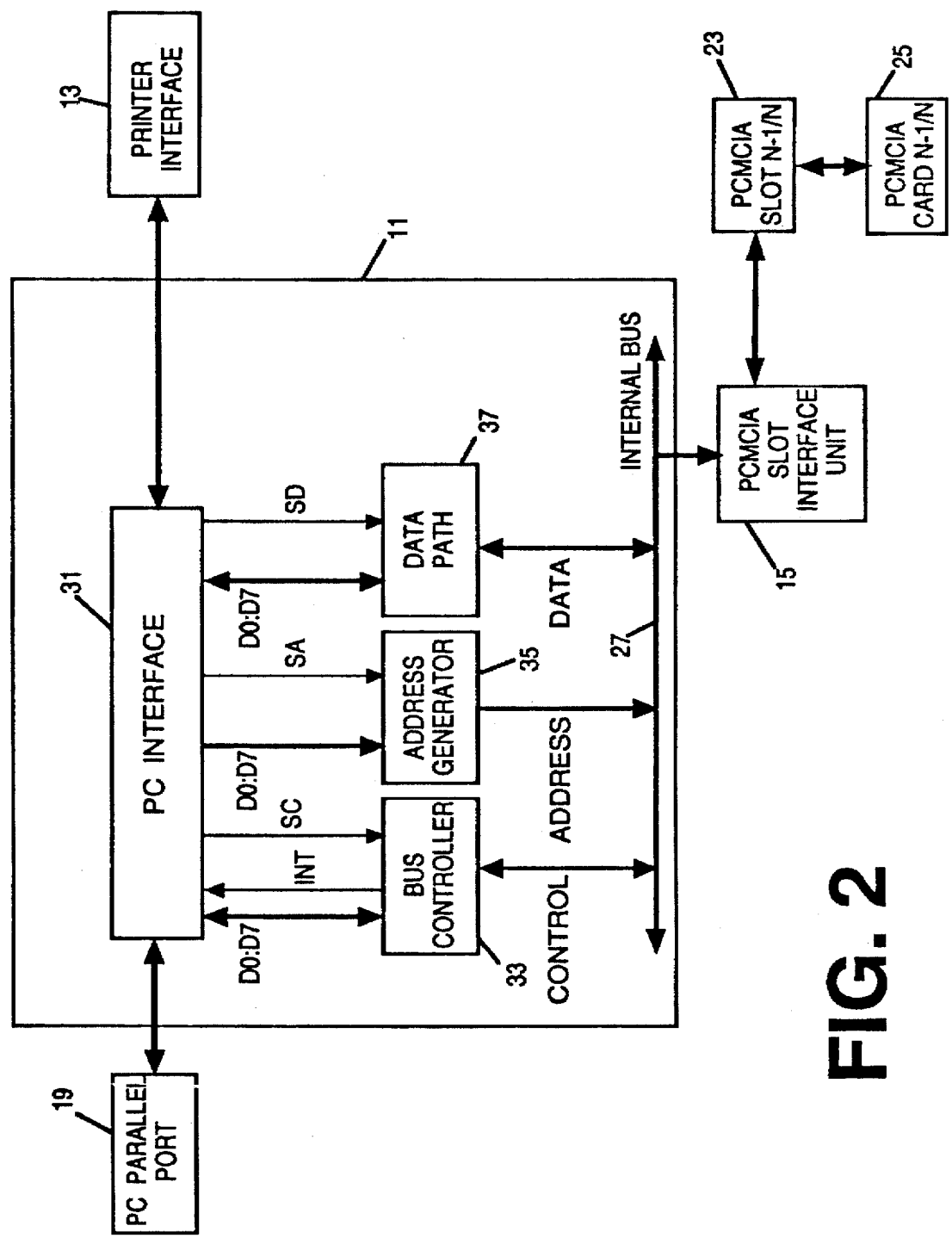
FIG. 2 is an illustration of an implementation of PC parallel port interface 11.

As shown in FIG. 2, parallel port interface 11 utilizes five sub-units as follows:
1 Internal bus 27
2 PC interface 31
3 Bus controller 33
4 Address generator 35
5 Data path 37

Internal Bus 27

Internal bus 27 includes address, data, and control signals and serves as the channel between parallel port interface 11 and PCMCIA slot interface units 15 in a commonly used bus mechanism. A specific PCMCIA card and registers within the PCMCIA card are selected by the address signals, then data is transferred via data signals controlled by control signals. In one embodiment, a subset of the ISA bus architecture as shown in Table I is used:

TABLE I

| Signal | Description |
| --- | --- |
| SA0:SA16 | System Address Bus |
| LA17:LA23 | Latched Address Bus |
| SD0:SD7 | Data bus |
| IRQ2:IRQ5 | Interrupt requests 2, 3, 4 and 5 |
| IRQ7 | Interrupt request 7 |
| IRQ9:IRQ12 | Interrupt requests 9, 10, 11 and 12 |
| IRQ14:IRQ15 | Interrupt requests 14 and 15 |
| AEN | Address Enable |
| BALE | Bus Address Latch Enable |
| IOCHRDY | Input/Output Channel Ready |
| IOCS16 | Input/Output Channel Select 16 |
| IORD | Input/Output Read Command |
| IOWD | Input/Output Write Command |
| MEMCS16 | Memory Channel Select 16 Bit |
| MEMRD | Memory Read |
| MEMWR | Memory Write |
| SBHE3 | System Bus High Enable 3 |
| SYSCLK | System Clock |
| ZEROWS | Zero Wait State |
| CLK | Clock |

A person skilled in the field will be familiar with these ISA bus signals and understand their corresponding uses.

PC Interface 31

PC interface 31 decodes commands and control signals sent by PC 17 through parallel port 19. Parallel port 19 is typically a port with 25 pins which can work in various modes such as uni-directional, bi-directional or enhanced parallel port. For example, in bi-directional mode, there are 17 active signals as follows: 8 bi-directional data lines, 4 control lines (output) and 5 status lines (input). Table II below shows the various signals available from parallel port 19 in bi-directional mode.

TABLE II

| Bus | Pin | Signal | Description |
| --- | --- | --- | --- |
| Data | 2–9 | D0:D7 | Data signals 0–7 |
| Control | 14 | ALF | Auto Line Feed |
| Control | 16 | Init | Printer Initialize |
| Control | 1 | Strobe | Data Strobe |
| Control | 17 | Select_In | Printer Select |
| Status | 11 | Busy | Printer Busy |
| Status | 10 | Ack | Data Accepted Acknowledge |
| Status | 12 | Paper_End | Printer Out of Paper |
| Status | 13 | Select_Out | Printer Select Acknowledge |
| Status | 15 | Error | Printer Error |

Figure 3:
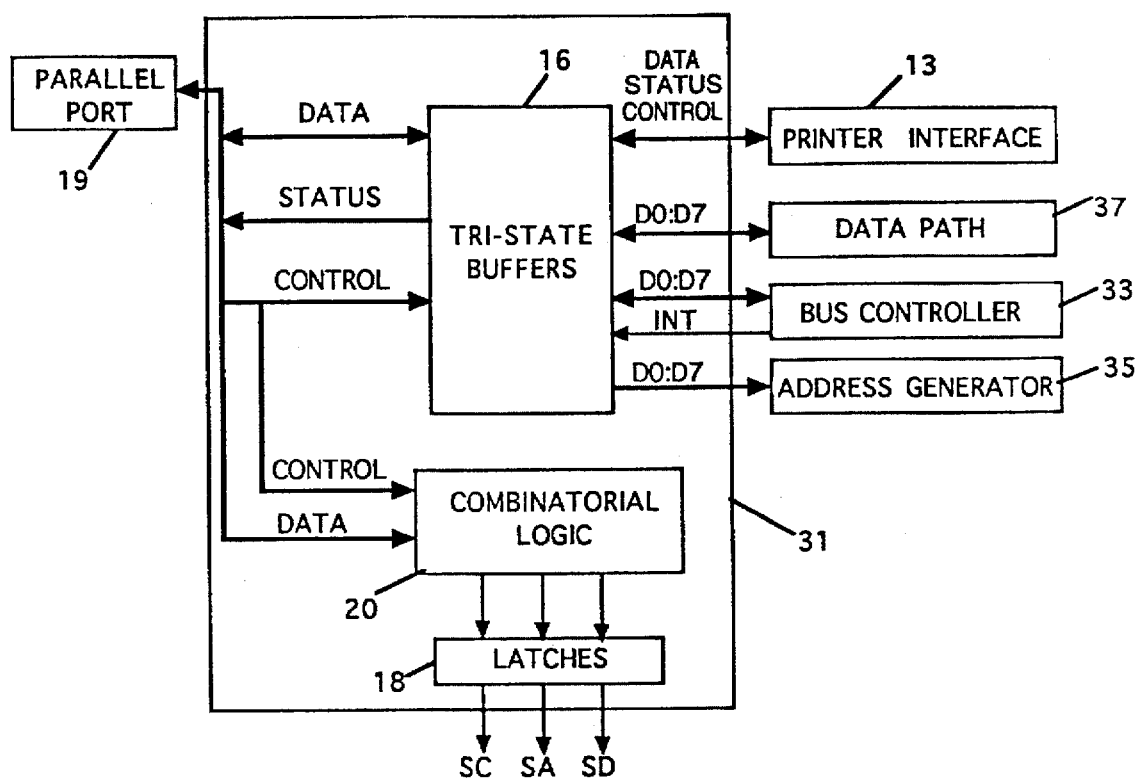
FIG. 3 is an illustration of an implementation of PC interface 31.

Upon sensing an access to local printer 21 (e.g., by Select_In signal, pin 17, being active), PC interface 31 provides a direct connection between parallel port 19 and printer interface 13. This direct connection, which switches the 17 signals from parallel port 19 between printer interface 13 and PCMCIA slot interface unit 15 is accomplished by well known prior art mechanisms, such as tri-state buffers 16 as shown in FIG. 3.

Upon sensing an access to a device other than the local printer access (e.g., by the Select_In signal, pin 17, being inactive and the Strobe signal on pin 1 being active), the 17 signals from parallel port 19 are decoded by PC interface 31 to be data, address or control. An example of such decoding would be to utilize the signals on pins 14 (ALF) and 9 (D7). For example, when the signal on pin 14 is low, the signals are decoded as data; when the signal on pin 14 is high and the most significant bit of the data (pin 9) is low, the signals are decoded as address; when the signal on pin 14 is high and the most significant bit of the data (pin 9) is high, the signals are decoded as control.

Thus, one or more of parallel port 19 signals can be selected to distinguish between actual data and commands. Other signals can be selected to indicate the specific command. For example, as previously noted, the parallel port signal ALF (pin 14) can be used to indicate a command and some of the data signals can be used to indicate specific commands. Command examples are: Configure (set the invented parallel port interface unit to a specific mode), Access_365_register (handle PCMCIA slot by accessing PCMCIA slot interface unit 15), Access_IO_ register (access a specific register within a PCMCIA card such as a LAN card). The specific meaning of each command to a card register depends on the application and the functionality of the card. However, for the purpose of this description and understanding of the present invention, the details regarding specific commands which may be utilized by a particular PCMCIA card are not important.

Combinatorial logic 20 within PC interface 31 is used to decode the specific command and activate selection signals SC, SA and SD according to the command which has been specified. Selection signals are latched in latch devices 18. This is done so that data accesses that follow the commands are sent to the correct device.

By way of example:

If the combinatorial logic senses the command "Access_IO_register" (for example, if the signal on pin 14 is asserted while the four most significant bits of D0:D7 are $1100_2$), the combinatorial logic activates the "select address" (SA) signal which is input to address generator 35, so that subsequent transfers of data will load address registers in address generator 35. This will generate address signals on internal bus 27.

If the combinatorial logic senses a command to generate a specific control signal to the internal bus (for example, if the signal on pin 14 is asserted while the four most significant bits of D0:D7 are $1000_2$), the combinatorial logic activates the "select control" (SC) signal which is input to bus controller 33, so that subsequent accesses load control registers in bus controller 33.

If the combinatorial logic senses a data transfer (for example, if the signal on pin 14 is not asserted), the combinatorial logic activates the "select data" (SD) signal which is input to the data path, so that subsequent accesses load data registers in data path 37.

The specifics of a suitable implementation of the combinatorial logic 20 used by PC interface 31 may be by using a PAL, ROM decoder or other such mechanism and should be readily apparent from this description to persons skilled in the art.

Then, proper data, address or control signals are generated by data path 37, address generator 35 or bus controller 33, and translated to signals meaningful to internal bus 27 by data path 37, address generator 35 or bus controller 33 respectively which perform the necessary translation as described below.

Bus Controller 33

Bus controller 33 generates the ISA control lines with correct timing similar to the ISA bus architecture standard, the differences being that a typical ISA cycle uses a control signal such as Memory-Read ($\overline{\text{MEMRD}}$) signaling the target device, and then the target device signaling back with a control signal such as IO-CHANNEL-READY ($\overline{\text{IOCHRDY}}$). The signaling back tells the bus master that data is ready on the bus, there has been enough time to respond, and it is ready to be sampled. However, in the present invention, signaling back is not needed, as by the time the PC software attempts to read the data back, the data is certain to be valid.

However, there are a few control signals from the PCMCIA card that go back to the PC through the parallel port that are used. For those signals, control information is encoded and transferred as data. An example is "telling" the PC which specific IRQ signal has gone active. This is done by the PC "polling" encoded information as data. The interrupt event itself is detected by the PC by polling, or by signaling as described below.

Figure 4:
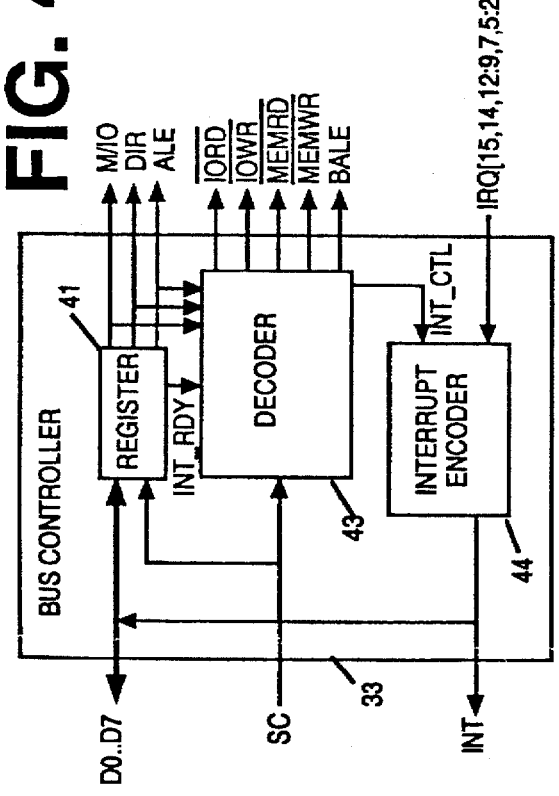
FIG. 4 is an illustration of an implementation of bus controller 33.

When bus controller 33 senses the "select control" (SC) signals from PC interface 31, it determines the specific control generated by reading D0:D7, and generates the required control signals on internal bus 27, such as IORD, BALE or the like from Table I. This may be accomplished by simple decoding of coded control signals and generating the required control signal accordingly. Bus controller 33 may be implemented by a register 41 and decoder 43 as shown in FIG. 4. The rising edge of the SC pulse latches three of the data signals (e.g., D0:D2) into the register. The contents of the register determines the state of the bus controller. M/IO corresponds to memory or I/O access. DIR corresponds to read or write action (direction) and ALE corresponds to address latch enable. The decoder decodes the actual bus controller signals from the above mentioned states, and generates the signal output qualified by the delayed SC pulse. The signal BALE (bus address latch enable) is asserted to indicate an ISA-like address cycle. IORD is asserted to indicate an ISA-like I/O read cycle. IOWR is asserted to indicate an ISA-like I/O write cycle. MEMRD is asserted to indicate an ISA-like memory read cycle. MEMWR is asserted to indicate an ISA-like memory write cycle.

Bus controller 33 operates to transfer signals placed on internal bus 27 by a PCMCIA card in slot interface unit 15 to parallel port 19 as follows.

All interrupt request (IRQ) signals placed on internal bus 27 are connected to interrupt encoder 44 within bus controller 33. Interrupt encoder 44 is a simple priority encoder with tri-state outputs.

Interrupt handling requires two mechanisms:
(a) informing the PC software which specific IRQ line is activated.
(b) interrupting the PC software when any of the IRQ signals is activated.

These two mechanisms are described below:

A. Informing The PC Software Which Specific IRQ Line Is Activated:

With reference to FIG. 4 interrupt encoder 44 encodes the sequential number of the highest priority IRQ signal which is active. The encoded binary number is output to the data lines via tri-state outputs.

When a INT-RD (read interrupt) command is issued by software, decoder 43 activates the signal INT_CTL. As a result, the next bus controller access will cause the interrupt encoder to open its tri-state outputs. In this manner, the encoded binary number of a pending interrupt can be read through the data lines.

B. Interrupting The PC Software When Any Of The IRQ Signals Is Activated:

Interrupting the PC software when any of the IRQ signals is activated can be done by polling, or by signaling.

If it is done by polling, the PC software is not signaled, but periodically checks for pending interrupts. For this purpose, it uses the above mentioned mechanism (informing the PC software which specific IRQ line is activated) periodically, not only to determine which specific IRQ is activated, but also to determine if any IRQ signal is activated at all.

If it is done by signaling, then when any of the IRQ signals is activated, interrupt encoder 44 activates the INT signal, which goes to PC interface 31. Within tri-state buffer 16, the ACK status line of the parallel port is activated whenever the INT signal is active. the PC parallel port is programmed by software to interrupt the PC software when ACK is activated.

The manner in which decoder 43 decodes SC, M/IO, DIR and ALE to generate IORD, IOWR, MEMRD, MEMWR, BALE INT_CTL is shown in the following truth-table:

| SC | M/IO | DIR | ALE | INT_RD | IORD | IOWR | MEMRD | MEMWR | BALE | INT_CTL |
|---|---|---|---|---|---|---|---|---|---|---|
| 0 | x | x | x | x | 0 | 0 | 0 | 0 | 0 | 0 |
| 1 | x | x | x | 1 | 0 | 0 | 0 | 0 | 0 | 1 |
| 1 | x | x | 1 | 0 | 0 | 0 | 0 | 0 | 1 | 0 |
| 1 | 0 | 1 | 0 | 0 | 1 | 0 | 0 | 0 | 0 | 0 |
| 1 | 0 | 0 | 0 | 0 | 0 | 1 | 0 | 0 | 0 | 0 |
| 1 | 1 | 1 | 0 | 0 | 0 | 0 | 1 | 0 | 0 | 0 |
| 1 | 1 | 0 | 0 | 0 | 0 | 0 | 0 | 1 | 0 | 0 |

In the foregoing truth-tsble, positive logic is used, x is don't care, the lines of the table corresponding to the following conditions respectively: no select, interrupt read, ALE, I/O Read, I/O Write, memory read and memory write.

Address Generator 35

Figure 5:
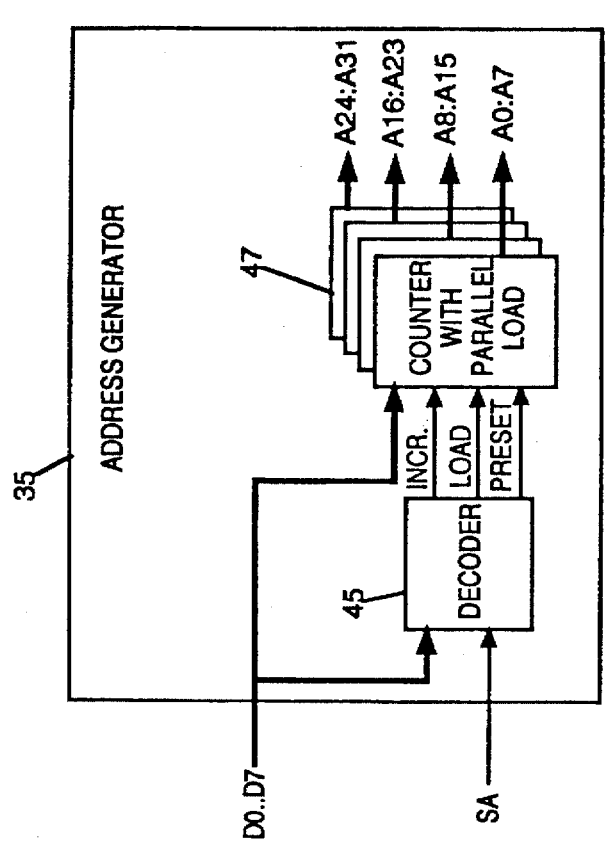
FIG. 5 is an illustration of an implementation of address generator 35.

The address generator 35 generates a PCMCIA card address for placement on internal bus 27. Address signals are changed by a command from the parallel port as decoded by PC interface 31. Upon sensing "select address" (SA) signals from PC interface 31, address generator 35 loads internal address registers via D0:D7 signals. When the full address is ready, address information is then placed on internal bus 27 by enabling a tri-state buffer. Address generator 35 may be implemented by a decoder 45, a set of counters 47 as shown in FIG. 5. The address is generated in the counters with parallel port latches. The decoder may be implemented by combinatorial logic which decodes an operation code placed on data bus D0:D7 which decodes as one of Increment (INCR), Load or Preset.

If the operation code decodes as "Increment" (e.g., X), then the next SA pulse will generate an "increment" pulse for the counters. This is done by decoding the specific combination (X) and qualifying the decoded signal by the SA signal. This will cause the address to increment.

If the operation code decodes as "Preset" (e.g., Y), then the next SA pulse will generate a "parallel load" pulse for the counters. This is done by decoding the specific combination (Y) and qualifying the decoded signal by the SA signal. This will cause a predefined address (such as the address of the PCMCIA slot interface unit 15) to be loaded into the counters 47 via their parallel load inputs (in this case, the counters serve as a data latches).

If the operation code decodes as "Load" (e.g., Z), then an internal 4-state counter is preset. The following four SA pulses will cause data from D0:D7 to be loaded into four portions of counters 47 (one after the other), via their respective parallel load input. This is done by using the outputs of the 4-state counter to select one of the address counters to be loaded at a time. Then the counter remains locked in a non-active state.

To increase performance, an optional "auto-address-increment" mode can be implemented so that consecutive addresses can be accessed faster. This is done using a counter device in address generator 35 that increments the addressed location placed on internal bus 27 by one after each data access.

Data Path 37

Figure 6:
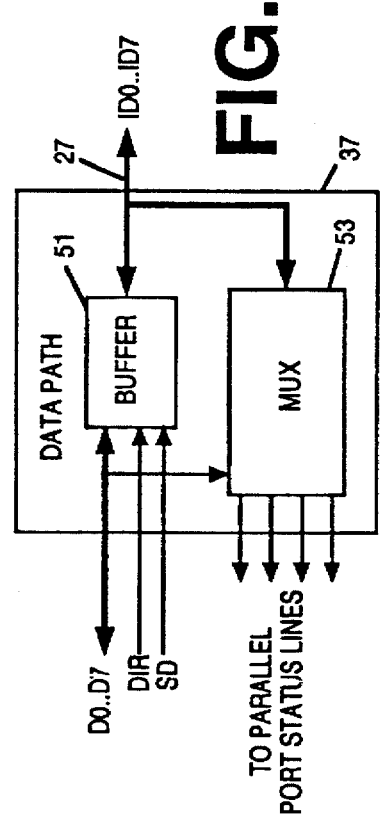
FIG. 6 is an illustration of an implementation of data path 37.

Data path 37 assembles and disassembles bytes to words and nibbles as follows. Parallel printer port 19 can read in nibbles in a unidirectional mode. Thus, byte disassembling is needed. In a similar way, access to a 16 bit ISA card may require that two bytes be assembled to word length data and vice-versa. Data path 37 may be implemented by an 8-bit bi-directional buffer 51, and MUX 53 as shown in FIG. 6. Bi-directional buffer direction is controlled by the DIR control signal (from bus controller 33) and enabled by the SD signal. This enables normal 8-bit bi-directional data transfer. To read 3 or 4-bit nibbles via parallel port status lines (for uni-directional mode), an 8 to 3 or an 8-to-4 MUX 53 is used to select which nibble of the internal bus ID0:ID7 is read and transferred to the parallel port status lines. The MUX is controlled by data bits of the data bus, e.g., D1 and D2.

A 16-bit internal bus may also be used in which case the 8-bit bi-directional buffer 51 should be replaced by a 16-bit bi-directional buffer-latch. This means that each 16-bit transfer from the parallel port to the internal bus is done as follows: first, the least significant 8 bits are latched into a latch. Then the most significant 8 bits are transferred via the 16-bit buffer, thus directing all 16 bits to the internal bus. To transfer 16 bits from the internal bus to the 8-bit parallel port, the first least significant 8 bits are read via the 16-bit buffer while latching the most significant 8 bits in a latch. Then, the most significant 8 bits are read from the latch. This mechanism expedites transfer as only one transfer is done on the internal bus. When a 16-bit internal bus is used, the MUX is a 16-to -4 (or 16 to 3) instead of a 8-to-4 or 8 to 3. In this case the MUX is controlled by 2 or 3 data bits, e.g., D1, D2, D3.

PCMCIA Slot Interface Unit 15

In the described embodiment, one PCMCIA slot interface unit 15 supports two PCMCIA slots 23. This is accomplished by using an Intel 82365SL IC which is capable of controlling two slots. However, the invention is capable of controlling one, two or more PCMCIA slots per PCMCIA slot interface unit by using a differently designed PCMCIA slot interface unit. The details concerning such different design should be readily apparent to persons skilled in the field of the invention and are not needed for a complete understanding of the invention.

Figure 7:
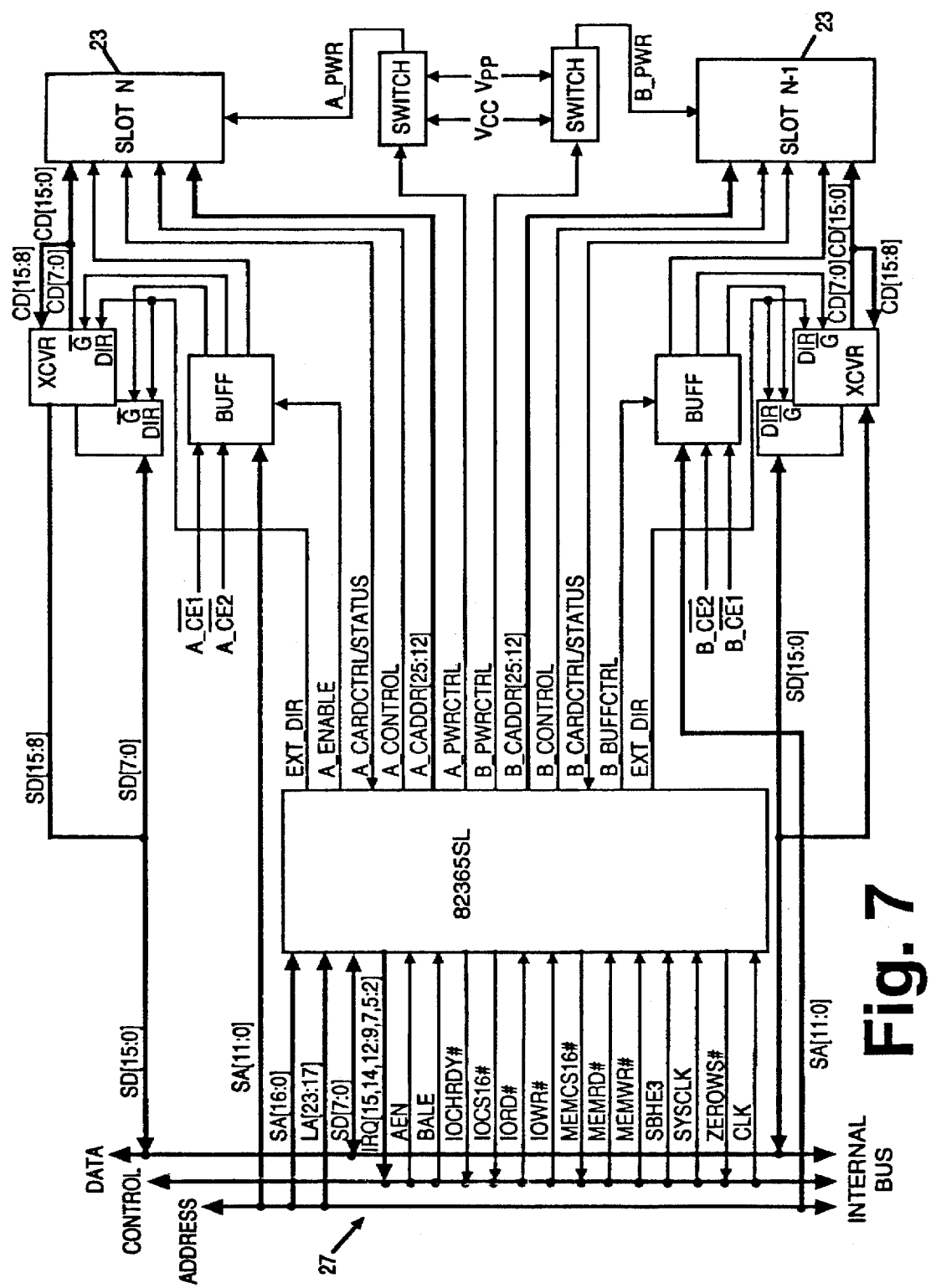
FIG. 7 is a block diagram of a slot interface unit according to the present invention.

The 82365SL controls the external transceivers (XCVR) and external buffers (BUFF) of PCMCIA slot interface unit 15 as shown in FIG. 7 to provide electrical isolation between the two PCMCIA slots and internal bus 27. The 82365 also provides all the required functions to implement PCMCIA protocol, including translating of address space and controlling the power supply for the PCMCIA slots. FIG. 7 shows a typical implementation of PCMCIA slot interface unit 15 using a 82365SL IC.

A PCMCIA slot 23 is supported by a PCMCIA slot interface unit 15 which translates PCMCIA standard slot signals to/from the internal bus. Each PCMCIA slot, and I/O or memory address within a slot, is addressed through the internal bus.

Printer Interface 13

Printer interface 13 drives a printer 21 through a connected cable when the printer is active. When control is taken from the printer and transferred to another device, the printer is disabled with a command (e.g., NIL which operates to keep all printer signals in their previous state). This is implemented using latch devices and line drivers, the specifics of which are well known in the art and are not needed for a complete understanding of the invention.

Figure 8:
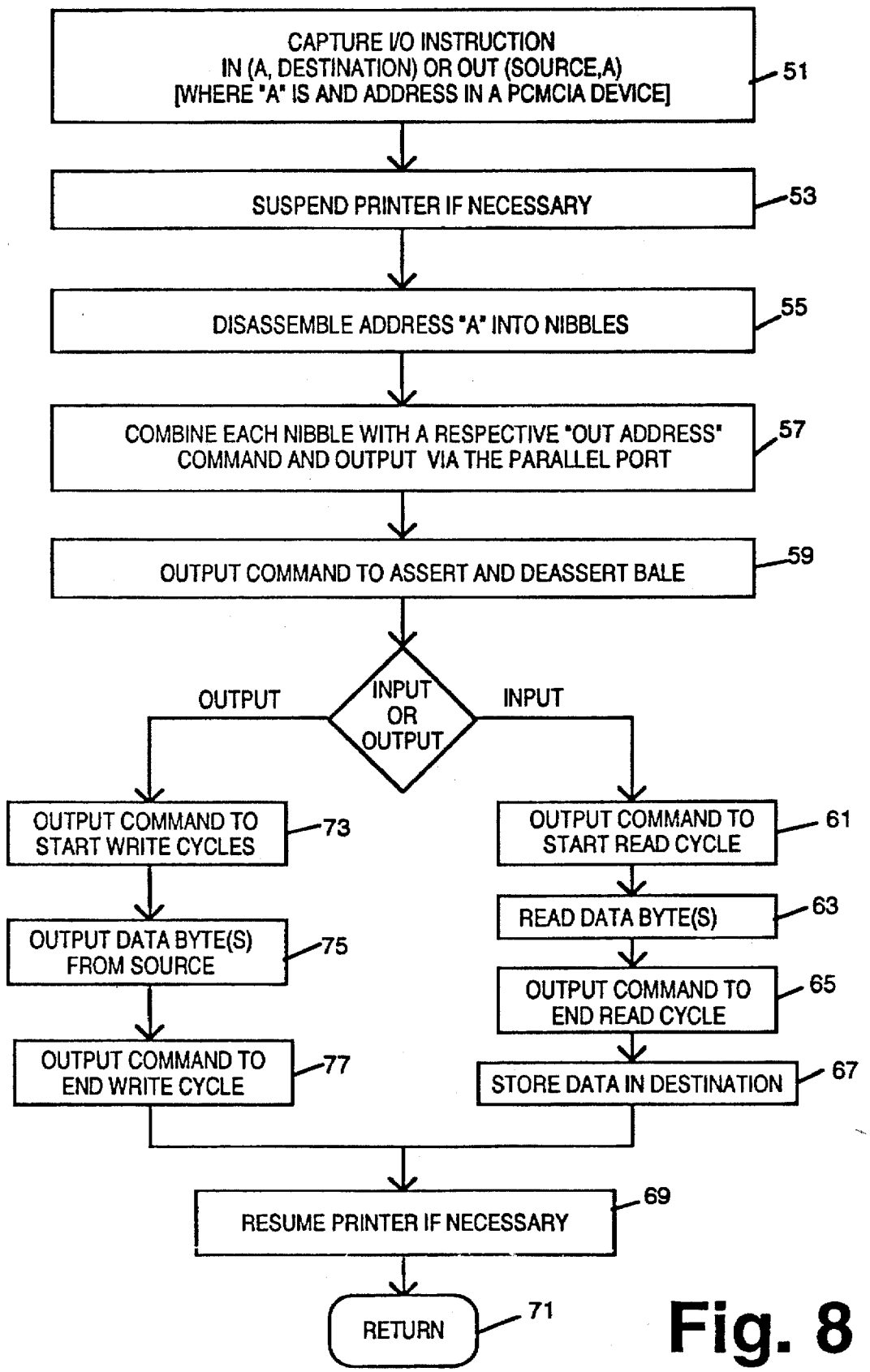
FIG. 8 is a flow chart of suitable add-on code for adapting an application running in a personal computer to use the invented parallel port interface.

To enable an application program running in personal computer 17 to access the functionality of a PCMCIA card, add-on code should be loaded in the memory of PC 17 (e.g., as a TSR program) to provide a translation service which translates PCMCIA accesses to data, commands and addresses transferred via the parallel port. This addition may be made by another program running in the personal computer which intercepts accesses to PCMCIA devices from the application program and replaces each access with a sequence of transfers via the parallel port. FIG. 8 is a flow chart of a suitable program for this purpose. This program is activated by an "exception handler" which is activated upon capturing of an I/O instruction targeted to the specific I/O address space.

The program operates by capturing all input and output instructions directed to an address in a PCMCIA address space (block 51). Then, if the port is being used for a print operation, that print operation is suspended to free the port (block 53). The PCMCIA address is then disassembled into nibbles of 7 bits or 4 bits each (block 51) and then each nibble is sent with an "Out Address" command to the parallel port (block 55). Then a command is sent to the parallel port to assert BALE (block 57) which causes the address latch on the PCMCIA card or controller to open. Then BALE is deasserted which causes the latches to close and latch the address (block 59).

If the captured I/O instruction is an input instruction, processing proceeds as follows.

1. A command is output to start read cycles (assert IORD) (block 61);
2. Bytes of data coming from the parallel port are read (block 63);
3. A command is output to end the read cycles after a sufficient delay to read data (block 65);
4. The read data is stored in the destination specified in the input instruction (block 67);
5. The printer operation is resumed if it had been previously suspended (block 69);
6. The TSR program returns control to the operating system (block 71).

If the captured I/O instruction is an output instruction, processing proceeds as follows.

1. A command is output to start a write cycles (block 73);
2. Bytes of data from the source specified by the output instruction are output to the parallel port (block 75);
3. A command is output to end the write cycles asserting IOWR and deasserting IOWR after a delay (block 77);
4. The printer operation is restarted if it had been previously suspended (block 69);
5. The TSR program returns control to the operating system (block 71).

I claim:

1. A PCMCIA card to parallel port adapter comprising:
   a) an internal bus;
   b) a personal computer interface means for coupling between a parallel port of a personal computer and a printer interface, said personal computer interface means for selecting one of a pair of paths for signals from said parallel port, for providing signals to said printer interface and for decoding said signals from said parallel port to be provided to said internal bus, said signals from said parallel port being decoded into one of data signals, address signals and bus control signals;
   c) bus controller means coupled to said personal computer interface means and to said internal bus for receiving said control signals and generating internal bus control signals for placement on said internal bus and for receiving signals from said internal bus for transmission to said parallel port;
   d) address generator means coupled to said personal computer interface means for receiving said address signals and generating internal bus address signals for placement on said internal bus;
   e) data path means coupled to said personal computer interface means for receiving said data signals and generating internal bus data signals for placement on said internal bus and for receiving signals from said internal bus for transmission to said parallel port,
   wherein said internal bus is coupled to said bus controller means, said address generator means and said data path means and is for coupling to a PCMCIA slot interface unit, said internal bus for receiving said internal bus control signals, internal bus address signals and internal bus data signals for transfer to said PCMCIA slot interface unit and for receiving internal bus data signals and internal bus control signals from said PCMCIA slot interface unit for transfer to said parallel port, said personal computer interface means enabling direct access to said address signals.

2. A system for accessing a PCMCIA card using a parallel port of a personal computer comprising:
   a) a PCMCIA card to parallel port adapter including:
      i) a personal computer interface means for coupling between a parallel port of a personal computer and a printer interface, said personal computer interface means for selecting one of a pair of paths for signals from said parallel port, for providing signals to said parallel port and for decoding said signals from said parallel port to be provided to an internal bus, said signals from said parallel port being decoded into one of data signals, address signals and bus control signals;
      ii) a bus controller means coupled to said personal computer interface means for receiving said control signals and generating internal bus control signals for placement on said internal bus and for receiving signals from said internal bus for transmission to said parallel port;
      iii) an address generator means coupled to said personal computer interface means for receiving said address signals and generating internal bus address signals for placement on said internal bus;
      iv) a data path means coupled to said personal computer interface means for receiving said data signals and generating internal bus data signals for placement on said internal bus and for receiving signals from said internal bus for transmission to said parallel port; wherein said internal bus is coupled to said bus controller means, said address generator means and said data path means and is for coupling to a PCMCIA slot interface unit, said internal bus for receiving said internal bus control signals, internal bus address signals and internal bus data signals from said parallel port for transfer to said PCMCIA slot interface unit and for receiving internal bus data signals and internal bus control signals from said PCMCIA slot interface unit for transfer to said parallel port;
   b) a first application program running in said personal computer under control of an operating system such that control is passed to said application program by said operating system when a second application program executes an instruction which seeks to access a PCMCIA card, said first application program operating to pass said PCMCIA access to said PCMCIA slot interface unit via said parallel port and said parallel port to PCMCIA card interface, wherein said program operates to:
      i) capture all input and output instructions directed to an address in a PCMCIA address space;
      ii) if the parallel port is being used for a print operation, suspend said print operation;
      iii) disassemble the PCMCIA address into nibbles of 7 bits or 4 bits each and send each nibble to the parallel port;
      iv) send a command to the parallel port to assert a signal to cause the address latch on the PCMCIA card to open and then deassert said asserted signal to cause the cause the address latch to close and latch the address;

v) if the captured I/O instruction is an input instruction:
1. output a command to start read cycles;
2. read bytes of data coming from the parallel port;
3. output a command to end the read cycles after a predetermined delay;
4. store the read data in a destination specified in the input instruction;
5. resume the printer operation if it had been previously suspended;
6. return control to the operating system;

vi) if the captured I/O instruction is an output instruction:
1. output a command to start write cycles;
2. output bytes of data from the source specified by the output instruction to the parallel port;
3. output a command to end the write cycles;
4. restart the printer operation if it had been previously suspended;
5. return control to the operating system.

3. A PCMCIA card to parallel port adapter comprising:

a) a personal computer interface means for coupling between a parallel port of a personal computer and a printer interface, said personal computer interface means for selecting one of a pair of paths for signals from said parallel port, for providing signals to said printer interface and for decoding said signals from said parallel port to be provided to an internal bus, said signals from said parallel port being decoded into one of data signals, address signals and bus control signals, said personal computer interface means including:

a set of tri-state buffers coupled to the parallel port for directing data from the parallel port to one of the printer interface and the internal bus;

combinatorial logic coupled to the parallel port which decodes the signals received from the parallel port and generates a set of interface control signals to indicate that said signals from said parallel port are one of said internal bus control signals, internal bus address signals and internal bus data signals; and a set of latches coupled to said combinatorial logic for latching said set of interface control signals.

b) bus controller means coupled to said personal computer interface means for receiving said control signals and generating internal bus control signals for placement on said internal bus and for receiving signals from said internal bus for transmission to said parallel port;

c) address generator means coupled to said personal computer interface means for receiving said address signals and generating internal bus address signals for placement on said internal bus;

d) data path means coupled to said personal computer interface means for receiving said data signals and generating internal bus data signals for placement on said internal bus and for receiving signals from said internal bus for transmission to said parallel port;

wherein said internal bus is coupled to said bus controller means, said address generator means and said data path means and is for coupling to a PCMCIA slot interface unit, said internal bus for receiving said internal bus control signals, internal bus address signals and internal bus data signals for transfer to said PCMCIA slot interface unit and for receiving internal bus data signals and internal bus control signals from said PCMCIA slot interface unit for transfer to said parallel port.

4. The PCMCIA card to parallel port adapter defined by claim 3 wherein said bus controller means comprises:

a) a register coupled to predetermined ones of said set of tri-state buffers for storing data from said predetermined ones of said set of tri-state buffers;

b) a bus decoder coupled to said register and said set of latches for decoding the data stored in said register as said internal bus control signals; and c) means for latching bus control signals placed on said internal bus by said bus controller means on said PCMCIA slot interface unit for transfer to said parallel port.

5. The PCMCIA card to parallel port adapter defined by claim 3 wherein said address generator means comprises:

a) an address decoder coupled to said set of tri-state buffers and said set of latches;

b) a set of counters coupled to said address decoder and said set of tri-state buffers, each of said counters for generating a subset of one of said internal bus address signals; and c) a second set of tri-state buffers coupled to said set of counters for storing a complete one of said internal bus address signals.

6. The PCMCIA card to parallel port adapter defined by claim 3 wherein said data path means comprises:

a) a bi-directional buffer coupled to said set of tri-state buffers and said set of latches; and b) a multiplexor coupled to said bi-directional buffer and said set of tri-state buffers, said multiplexor operating to assemble nibbles to bytes and words and to disassemble bytes and words to nibbles.

\* \* \* \* \*